(12) United States Patent
Garnault et al.

(10) Patent No.: US 12,240,588 B2
(45) Date of Patent: Mar. 4, 2025

(54) AIRCRAFT RADOME INCORPORATING A LIGHTNING PROTECTION SYSTEM, AND AIRCRAFT COMPRISING SUCH A RADOME

(71) Applicant: COMPOSITE INDUSTRIE, Bondoufle (FR)

(72) Inventors: Christophe Garnault, Perthes (FR); Philippe Martins, Villemoisson/Orge (FR)

(73) Assignee: COMPOSITE INDUSTRIE, Bondoufle (FR)

( * ) Notice: Subject to any disclaimer, the term of this patent is extended or adjusted under 35 U.S.C. 154(b) by 85 days.

(21) Appl. No.: 18/044,177

(22) PCT Filed: Sep. 8, 2021

(86) PCT No.: PCT/EP2021/074728
§ 371 (c)(1),
(2) Date: Mar. 6, 2023

(87) PCT Pub. No.: WO2022/053527
PCT Pub. Date: Mar. 17, 2022

(65) Prior Publication Data
US 2023/0331368 A1   Oct. 19, 2023

(30) Foreign Application Priority Data

Sep. 8, 2020  (FR) ...................... 2009090

(51) Int. Cl.
*B64C 1/36* (2006.01)
*B64D 45/02* (2006.01)
(Continued)

(52) U.S. Cl.
CPC ................ *B64C 1/36* (2013.01); *B64D 45/02* (2013.01); *H01Q 1/286* (2013.01); *H01Q 1/42* (2013.01)

(58) Field of Classification Search
CPC .......... B64C 1/36; B64D 45/02; H01Q 1/286; H01Q 1/42; H01Q 1/002; H02G 13/00
See application file for complete search history.

(56) References Cited

U.S. PATENT DOCUMENTS 3,416,027 A * 12/1968 Amason ................... H01Q 1/42
                                                      313/325
8,004,815 B2   8/2011 Loche
(Continued)

FOREIGN PATENT DOCUMENTS

EP   2219950 B1   8/2010
EP   2743185 A1   6/2014
(Continued)

OTHER PUBLICATIONS

International Search Report and Written Opinion received for PCT Serial No. PCT/EP2021/074728, on Mar. 17, 2022, 12 pgs.

*Primary Examiner* — Valentina Xavier
(74) *Attorney, Agent, or Firm* — Merchant & Gould P.C.

(57) ABSTRACT

An aircraft radome includes a composite structure including, or according to the circumstances configured to define, at least one housing extending along the radome from a base of the radome. The housing receives an electrically conductive strip in contact with an inner surface of an outer wall, or according to the circumstances flush with the outer wall, of the composite structure. A conductive base is situated in the region of the radome base and connected to a ground of the aircraft. The composite structure of the radome is devoid of any perforations or through-passages in the region of the electrically conductive strip, and a first end of the electrically conductive strip is in contact with the conductive base.

18 Claims, 7 Drawing Sheets

(51) Int. Cl.
*H01Q 1/28* (2006.01)
*H01Q 1/42* (2006.01)

(56) References Cited

U.S. PATENT DOCUMENTS

2006/0051592 A1 3/2006 Rawlings
2018/0342332 A1 11/2018 Mesnage

FOREIGN PATENT DOCUMENTS

| FR | 2924685 A1 | 6/2009 | |
|----|------------|--------|---|
| FR | 2924687 A1 * | 6/2009 | ............. B64D 45/02 |
| WO | 2009080991 A1 | 7/2009 | |

* cited by examiner

AIRCRAFT RADOME INCORPORATING A LIGHTNING PROTECTION SYSTEM, AND AIRCRAFT COMPRISING SUCH A RADOME

CROSS-REFERENCE TO RELATED APPLICATIONS

This application is a National Stage Application of PCT/EP2021/074728, filed 8 Sep. 2021, which claims benefit of Serial No. 2009090, filed 8 Sep. 2020 in France, and which applications are incorporated herein by reference. To the extent appropriate, a claim of priority is made to each of the above disclosed applications.

TECHNICAL FIELD

The invention relates to the technical field of radomes for aircraft. In particular, it concerns radomes incorporating a lightning protection system. The invention also relates to an aircraft equipped with such a radome.

TECHNICAL BACKGROUND

Classically, the aircrafts comprise a primary structure with outer walls mostly made from composite structures. The composite structures have a very favourable strength to weight ratio for use in such apparatus. The radome forming the protective outer wall of the antenna also incorporates such composite structures.

However, these composite structures can be damaged by lightning. Indeed, a lightning strike generates very high densities of electrical charge locally, which can damage them. These electrical charges cannot be evacuated by these composite structures, which are electrically insulating. Therefore, a lightning protection system is used, such as a metal mesh integrated into these composite structures, to ensure the evacuation of the electrical charges towards the ground of the aircraft. However, in the case of the radome, there is a design constraint since it must interfere as little as possible with the signals transmitted and received by the antenna. It is therefore not possible to provide a lightning protection system such as a metal mesh, which would be harmful to the quality of radio exchanges.

To protect the radome from lightning strikes, the aeronautical industry generally uses electrically conductive strips, usually made of aluminium or copper, integrated into the radome. These strips are electrically connected to the ground of the aircraft.

For example, electrically conductive strips protruding from the outer surface of the radome have been proposed. The disadvantage of such electrically conductive strips positioned on the outer surface, and therefore not flush with the outer surface, is that they create discontinuities in the flow of the flux around the aircraft and therefore reduce the aerodynamic performance thereof.

More recently, it has been proposed to limit aerodynamic disturbances by using a lightning protection system in which electrically conductive strips are placed on a face of the radome not exposed to the air flux, in particular, on the inner face of the radome.

The document U.S. Pat. No. 8,004,815 B2 discloses an aircraft radome comprising such a lightning protection system. The lightning protection system comprises an external wall 10, an inner wall 11 and a plurality of electrically conductive strips 13 located on the inner wall 11 and on an unexposed face of the external wall 10. The lightning current is received by means of metal studs 15 flush with the exposed face of the external wall 10. The metal studs 15 comprise a threaded cylindrical portion passing through the electrically conductive strips 13, which in turn allows the latter to receive the lightning current. Furthermore, the threaded cylindrical portion of the metal studs 15 extends well beyond the electrically conductive strips 13. In fact, nuts 17 are arranged on the other side of the electrically conductive strips 13 in order to cooperate with the threaded cylindrical portion of the metal studs 15 and allow the electrically conductive strips 13 to be fixed.

However, such a system requires the radome to be drilled at several points in a line. This increases the risks in terms of long-term mechanical strength and the risk of water infiltration into the composite structure or even inside the radome. Furthermore, due to the use of metal studs, the metal surface area receiving lightning is very limited compared to that of an externally projecting strip, which increases the risk of local damage to the radome due to lightning strikes.

The document EP 2 219 950 B1 discloses a radome comprising a composite structure 3 comprising a lightning protection system in which electrically conductive strips of copper or aluminium are flush with an outer surface 9 of the radome. In this regard, the outer surface 9 has a hollow profile into which the electrically conductive strips 1 extend. Each electrically conductive strip 1 is attached to the composite structure 3 by means of a number of attachment means 8, 10. The attachment means 8, 10 consist of screws 10 and nuts 8. The screws 10 extend across the electrically conductive strip 1. Each of them has a surface 2 flush with the outer surface 9 and an external thread which cooperates with a drilling hole in the electrically conductive strip 1 which has equivalent cooperation means for this purpose.

In such a system, as the external surface 9 is pierced at several points at the level of the electrically conductive strips 1, this increases the risks in terms of long-term mechanical resistance and the risks of water infiltration into the composite structure or even into the interior of the radome. Indeed, during a lightning strike, the material of the external surface is necessarily pulverised due to the energies involved. Repeated lightning strikes are therefore likely to degrade the outer surface even more rapidly through holes (e.g., due to drilling) in that surface.

There is therefore a need to provide an aircraft radome with an aerodynamic lightning protection system, to limit the risks in terms of long-term mechanical strength as well as the risks of water ingress into the composite structure and the radome.

SUMMARY OF THE INVENTION

To meet this need, the invention proposes an aircraft radome comprising:
  a composite structure defining at least one housing located inside or outside the composite structure and extending along the radome from a base of said radome, said at least one housing receiving an electrically conductive strip and said conductive strip being either in contact with an inner surface of an external wall of the composite structure when said at least one housing is inside the composite structure or flush with the external wall of the composite structure when said at least one housing is outside the composite structure,
  a conductive base located at the level of said radome base and connected to a ground of the aircraft,
  said composite structure being devoid of any perforations or passages through the external wall at the electrically conductive strip and a first end of said electrically conductive strip being in contact with the conductive base.

According to various features of the invention which may be taken together or separately:

- when the electrically conductive strip is flush with the external wall, an inner surface of the electrically conductive strip conforms the contours of the housing;
- the composite structure further comprises an inner wall and a core, for example in the form of a honeycomb, located between the external wall and the inner wall;
- the core is made of a single material along the radome;
- the radome further comprises at least one other housing formed in the external wall;
- the other housing is located in the extension of the housing and receives a second end of the electrically conductive strip and means for attaching said second end of the electrically conductive strip to the external wall;
- the attachment means is flush with portions of the external wall other than a portion where the second housing is formed;
- the attachment means is in the form of a patch attaching the second end of the electrically conductive strip in said at least one other housing;
- when the electrically conductive strip is in contact with the inner surface of the external wall of the composite structure, the housing comprises a U-shaped longitudinal portion comprising two longitudinal legs and a transverse leg, said housing comprising two hooking tabs at the inner surface of the external wall, said hooking tabs extending from the longitudinal legs;
- the composite structure further comprises an inner wall and a core, for example in the form of a honeycomb, located between the external wall and the inner wall, the housing extending through the thickness of the core;
- the core comprises, in a volume V3 having as a base the housing and having as its height the distance between the housing and the inner wall, a material different from a material of the rest of the core;
- the radome comprises adhesion strips located at interfaces between the material and the rest of the core;
- the external wall has a thickness of between 0.15 mm and 1 mm;
- the first end of the electrically conductive strip bypasses the composite structure at the base;
- said first end of the electrically conductive strip is U-shaped;
- said first end of the electrically conductive strip comprises a first longitudinal leg extending into the housing, a second longitudinal leg contacting the base and a transverse leg connecting the first and second longitudinal legs bypassing the composite structure at the base;
- the composite structure comprises only the external wall, the housing and the electrically conductive strip, the inner surface of the external wall directly facing the interior of the radome;
- the electrically conductive strip is straight between the first end and the second end.

The invention further relates to an aircraft comprising an antenna capable of transmitting and receiving a radio frequency signal and a radome as previously described.

BRIEF DESCRIPTION OF THE FIGURES

Further objects, features and advantages of the invention will become clearer in the following description, made with reference to the attached figures, in which.

DETAILED DESCRIPTION

Figure 1:
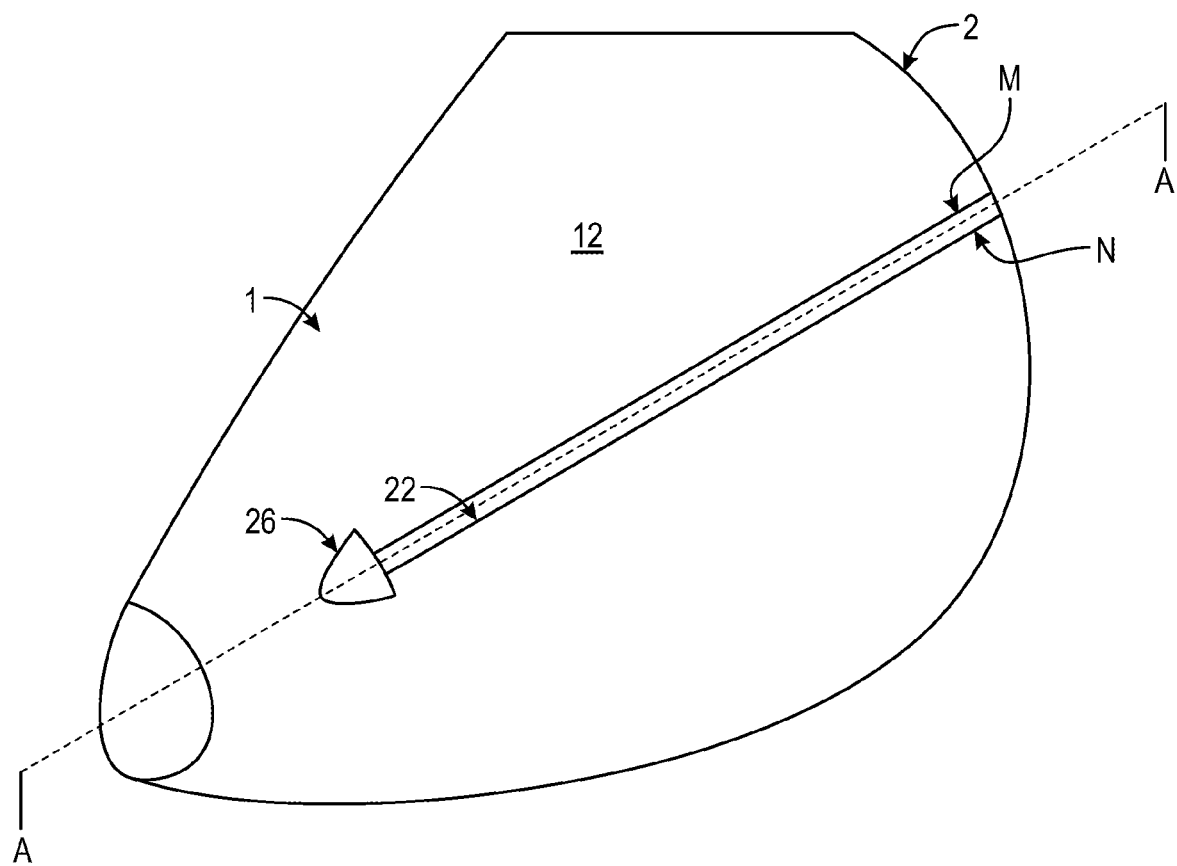
FIG. 1 shows a perspective view of a radome according to a first embodiment of the invention.

With reference to FIG. 1, the invention relates to an aircraft nose radome 1 intended to protect an antenna located in the foremost part of the aircraft. However, in the context of the invention, the radome can also be a tactical radome placed in front of the aircraft underneath it. The radome may also be a SATCOM (Satellite Communication) radome used to protect satellite antennas on the aircraft. This type of radome is usually placed on an upper part of the aircraft. Still within the scope of the invention, the radome can also be placed on the rear part of the aircraft, in particular on an upper fairing of the aircraft, also on a side of the aircraft, etc.

In the following description, it has been chosen to describe the invention more precisely in the context of an application to a nose radome, without the invention therefore being limited to this single application.

The radome 1 comprises a base 2 which physically separates it from the rest of the aircraft (not shown). It comprises an electrically conductive base 3 (not visible in FIG. 1), located at the base 2, which allows the radome 1 to be electrically connected to ground of the aircraft.

In addition, the radome 1 comprises a composite structure 10 configured to provide lightning protection.

The composite structure 10 comprises an external wall 12 made of an electrically insulating material and an electrically conductive strip 22, for example of aluminium or copper. Due to its external positioning, the external wall 12 is susceptible to electricity from lightning while the aircraft is in flight. In this regard, the electrically conductive strip 22 is arranged with respect to said external wall 12 so as to conduct electricity generated by lightning strikes to the conductive base 3. The arrangement of the electrically conductive strip 22 with respect to the external wall 12 will be described in more detail below with reference to the various embodiments.

According to a first aspect of the invention, a first end 24 of the electrically conductive strip 22 is in contact with the conductive base 3. Thus, as the conductive base 3 is connected to the ground of the aircraft, the electrically conductive strip 22 is also electrically connected to the aircraft ground via said conductive base 3. The electricity received by the lightning strike can thus be conducted to the aircraft ground, thus preventing any damage to the external wall 12, which is insulating by nature, by pulverising the material of said external wall 12. The composite structure 10 thus configured allows to protect the radome 1 from lightning strikes. We will come back to this in the description relating to FIGS. 4, 5, 9 and 10.

According to a second aspect of the invention, the composite structure 10 is devoid of perforations or passages passing through the external wall 12 at the level of the electrically conductive strip 22. In other words, the external wall 12 of the composite structure may not comprise, in particular, through perforations resulting from machining or human intervention. This is made possible because the electrical connection of the electrically conductive strip 22 to the aircraft ground is made by the contact between the first end 24 and the conductive base 3. More generally, the external wall 12 may not comprise any through passages. A "passage" is a place where a fluid can pass through. A perforation is therefore a particular type of passage. In other words, a passage is not necessarily a perforation, the term passage referring more generally to any place through which a fluid may pass through the external wall 12.

As discussed in the preamble to this detailed description, this is not typically the case with composite structures of the prior art, in which means for attaching and/or grounding the electrically conductive strip always pass through at least the electrically conductive strip and the external wall. Thus, in the event of repeated lightning strikes to the composite structure, the latter being perforated at the attachment and/or grounding means of the electrically conductive strip, there is an increased risk that the size of these perforations will increase by spraying the material at their location and that ultimately the structural integrity of the radome will be compromised and fluid may leak into the radome.

The absence of through perforations in the external wall 12, i.e., perforations passing through the external wall 12, at the level of the electrically conductive strip 22 prevents premature wear of the composite structure 10 and favours a good mechanical resistance of the radome 1 even after several lightning strikes. Indeed, the external wall 12 forms a physical interface between the exterior of the radome 1 and the interior of the composite structure 10. In some cases, as will be seen below, it can form with the electrically conductive strip 22 the interface between the outside and the inside of the radome.

It should be noted that "at the level of the electrically conductive strip 22" means the volume of the composite structure 10 located around the sectional plane of the electrically conductive strip 22, the sectional plane of the electrically conductive strip 22 being defined as the plane normal to the external wall 12 passing through the longitudinal axis of the electrically conductive strip 22.

It is therefore understood that the volume of the composite structure 10 located around the electrically conductive strip 22, including the electrically conductive strip 22 itself, is a volume in which there must be no fluid or electrical passage (lightning strikes) to the interior of the composite structure to avoid degrading its mechanical strength.

The aforesaid volume is therefore not limited to the embodiments presented in the present description only, but may adopt variable geometries according to any configuration of the electrically conductive strip 22 with respect to the external wall 12 which, without being illustrated or exemplified in the present invention, would be as previously defined.

For example, in the event that it is the electrically conductive strip 22 itself which by its configuration is likely to create a passage for fluid from the outside to the inside of the radome, the volume of the composite structure 10 located at the electrically conductive strip 22 corresponds at least to the volume of said strip itself.

Furthermore, with regard to the "through perforation(s)", what is important in the context of the invention is that it does not pass through the external wall 12.

A perforation going through the external wall 12 may consist of a succession of perforations which by virtue of their close positioning or in a chain create a communication between the exterior of the radome and the interior of the composite structure. For example, two drillings made in the external wall 12 without each of them passing completely through the external wall 12 if said drillings or passages are arranged to create a pathway for a fluid, for example air.

As will be explained below, the external wall 12 does not comprise any perforations or passages to the interior of the composite structure 10. The external wall 12 is therefore completely continuous. Incidentally, as discussed above, all of the elements of the radome, including the electrically conductive strip 22, are arranged so as never to pass through the thickness of the external wall 12 themselves.

According to another aspect of the invention, the radome 1 can be protected from premature wear without compromising the aerodynamic properties of the aircraft. In this regard, the composite structure 10 defines at least one housing 20 located inside or outside the composite structure 10 and extending along the radome from the base 2. The housing 20 receives the electrically conductive strip 22 and according to the embodiment, either the electrically conductive strip 22 is in contact with an inner surface 13 of the external wall 12 when the housing 20 is inside the composite structure 10 or it is flush with said external wall 12 when the housing 20 is outside the composite structure 10. By being positioned in this way, the electrically conductive strip 22 does not generate asperities on the surface of the external wall 12, which asperities are likely to replicate on upper layers (e.g., antistatic, anti-erosion and protective coating layer) and thus does not disturb the air flow on the radome 1. As a result, the positioning of the electrically conductive strip 22 does not have an adverse effect on the aerodynamic properties of the aircraft.

FIGS. 2 to 5 illustrate a first embodiment of the invention in which the electrically conductive strip 22 is flush with the external wall 12, said housing 20 being outside the composite structure 10. The housing 20 is understood to be "outside the composite structure 10" when the housing 20, although belonging to the composite structure 10, is positioned on the side of external portions 11 of the external wall 12.

Figure 2:
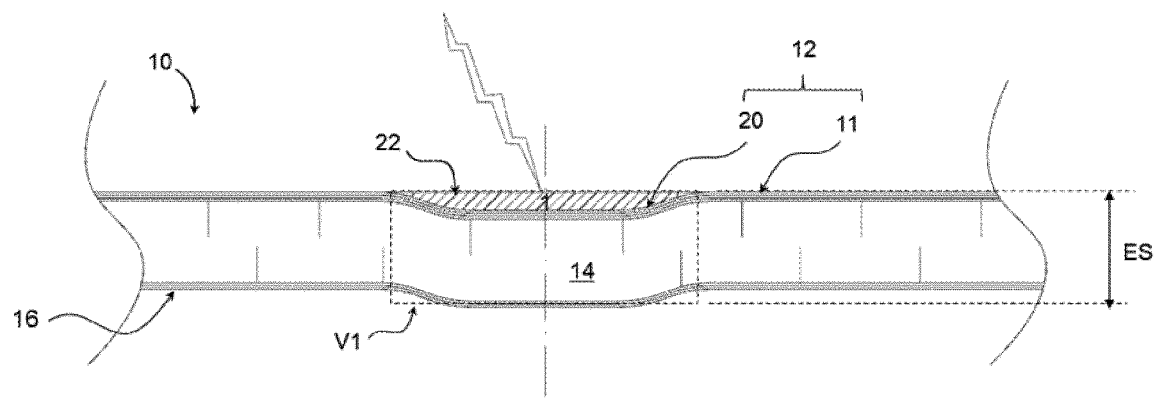
FIG. 2 illustrates a cross-sectional view of the radome of FIG. 1.

With reference to FIG. 2, in this first embodiment the housing 20 is formed directly in the external wall 12. In other words, the housing 20 is an integral part of the external wall 12. Advantageously, the housing 20 is in the form of a hollow profile formed in the external wall 12. The hollow profile shape of the housing 20 is not only adjusted to the contours of the electrically conductive strip 22, but also the depth of the hollow profile and thus of the housing 20 is adapted so that the electrically conductive strip 22 is flush with the external wall 12. The shape of the hollow profile is "fitted" in that the housing 20 conforms to the shape of the electrically conductive strip 22 while being tightly packed around said electrically conductive strip 22.

Indeed, the hollow profile is made during the moulding of the radome 1 by adequately combining the constructional principle of the radome 1 with the dimensions of the electrically conductive strip 22. This means that already at the design stage, the dimensions of the electrically conductive strip 22 constitute a constraint to be taken into account when defining the dimensions of the housing 20. In this respect and from a practical point of view, the moulding of the radome at the level of the housing 20 is carried out on a male cavity in a die mould. This method of forming the housing 20 avoids modifying the structure of the radome 1 by adding densified zones. It should be further noted in relation to this embodiment that the electrically conductive strip 22 is not attached to the housing 20 using through attachment means, otherwise a drilling would also be formed in the external wall 12, in which the housing 20 is formed. Preferably, the electrically conductive strip 22 is bonded into the housing 20. For this structural bonding, an adhesive such as 3M EC2216 may be used. Alternatively, it is also possible to carry out a cofiring by means of a self-adhesive film or prepreg to enable the electrically conductive strip 22 to be attached to the housing 20.

Figure 3A:
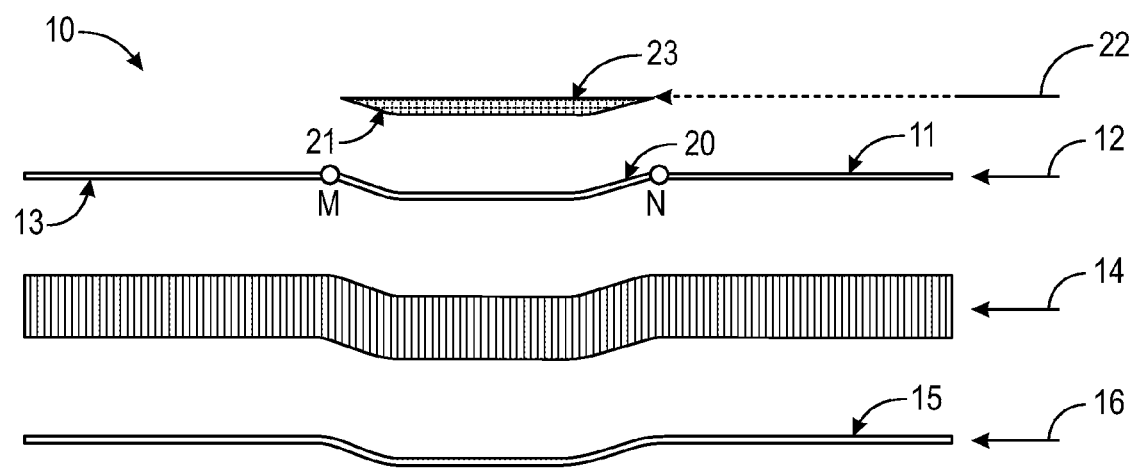
FIG. 3a illustrates an exploded view of the cross-sectional view of FIG. 2.

As can be seen in FIG. 3a, the electrically conductive strip 22 advantageously comprises an inner surface 21 conforming to the contours of the housing 20. Thus, the inner surface 21 has a profile substantially identical to that of the hollow profile formed by the housing 20. In addition, the electrically conductive strip 22 comprises an outer surface 23 flush with the external portions 11 of the external wall 12 other than a portion where the housing 20 is formed. The external surface 23 precisely follows the profile of the portions 11. In other words, the external surface 23 is substantially flush with an imaginary surface passing through two lines M and N of the external wall 12 delimiting the housing 20 from the portions 11 and following the shape of the portions 11. These lines M and N are illustrated in FIG. 1 (in perspective) and 3a (in section). The portions 11 and the outer surface 23 thus define the shape of the contour, i.e., the "wet" surface, of the radome 1. The arrangement of the electrically conductive strip 22 and the housing 20 in relation to the external wall 12 thus ensures that the air flow over the radome 1 is not impeded. In view of the above, it should be noted that the depth of the housing 20 thus corresponds to the distance between a bottom of the housing 20 and the imaginary surface passing through the two lines M and N.

Figure 3B:
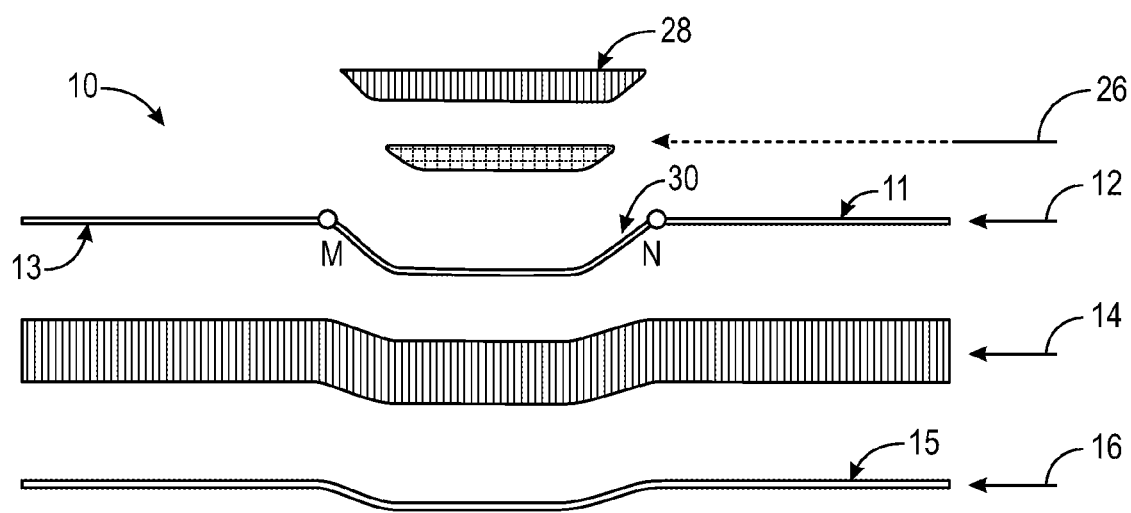
FIG. 3b shows an exploded view of the cross-sectional view of FIG. 2, at a second end of the electrically conductive strip.

Furthermore, as illustrated in FIG. 3b, the electrically conductive strip 22 comprises a second end 26 and the composite structure 10 comprises a second housing 30 formed in the external wall 12 and receiving the second end 26 and means 28 for attaching the second end of the electrically conductive strip in the second housing 30.

The second housing 30 is in line with the housing 20, i.e., it adjoins the housing 20 and like the latter, the second housing 30 is free from through perforations as it is formed in the external wall 12.

Advantageously, the attachment means 28 is fixed above the electrically conductive strip 22 in the second housing 30, thereby protecting the second end 26 of the electrically conductive strip from becoming detached due to air flux. Indeed, unlike the first end 24 of the electrically conductive strip 22, the second end 26 is oriented in the opposite direction to the air flux. Indeed, when the aircraft is in flight, the air flux flows from the front of the radome towards the base 2. Preferably, the attachment means 28 is wider than the electrically conductive strip 22 itself so as to improve the attachment of said strip 22. FIG. 1 further illustrates an example of an embodiment in which the attachment means 28 has a triangular shape overlapping and projecting beyond the second end 26.

The attachment means 28 may be in the form of a patch, i.e. a generally flat and adhesive element, put in place during the draping phase by creating a reservation for the second end 26. More precisely, the attachment means 28 comprises several adhesive faces, one being the face in contact with the electrically conductive strip 22 and at least two other faces in contact with lateral edges of the second housing 30.

The radome 1 according to the invention also takes into account aerodynamic stresses at this second end 26. In this respect, the attachment means 28 advantageously flush with the portions 11 of the external wall 12 other than a portion where the second housing 30 is formed. In other words, a face of the attachment means 28 exposed to the air flux is substantially coincident with an imaginary surface passing through the two lines M and N of the external wall 12 and following the shape of the portions 11, in a manner similar to the external surface 23 of the electrically conductive strip at the level of the housing 20. It should be noted that it does not matter whether the face of the attachment means 28 facing the outside of the radome is adhesive or not, since antistatic, anti-erosion and protective coatings cover the entire compositional structure 10 once it is completed. What is important is that the side of the attachment means 28 facing the outside of the radome is flush with the portions 11 so that during the subsequent deposition of these coating layers there is no obstacle to disturb the flow of air.

Like the housing 20 with the electrically conductive strip 22, the second housing 30 forms a hollow profile fitted to the contours of the second end 26 and the attachment means 28 and its dimensions are adapted so that said attachment means 28 is flush with the external wall 12. In this regard, as illustrated in FIG. 3b, the second housing 30 may be deeper than the housing 20, as in addition to receiving the second end 26 of the electrically conductive strip, the second housing 30 receives the attachment means 28. During manufacture, the male cavity used to form the radome 1 is therefore adapted to take account of this dimensioning. It should be noted that, for simplicity, the second housing 30 is shown in FIG. 3b with a similar shape to that of the housing 20, but that the second housing 30 may have a different shape. For example, this shape could be the triangular shape shown in FIG. 1.

As previously mentioned, the composite structure 10 is devoid of perforations through the external wall 12 at the electrically conductive strip 22. In this embodiment of the radome 1, the composite structure 10 is also devoid of any mechanical parts for attaching the conductive strip 22 to the composite structure 10 in a volume V1 of the composite structure 10 having as a base, in a geometrical sense, the external surface 23 of the electrically conductive strip and having as a height, in a geometrical sense, a thickness ES of the composite structure 10 (illustrated in FIG. 2). It should be noted that the composite structure has substantially the same thickness ES along the radome 1. The composite structure 10 thus has a structural homogeneity in the volume V1 that allows it to better resist repeated lightning strikes, which results in the elimination of the risk of water infiltration in the composite structure 10 as well as the elimination of stress concentrations around the drilling zones under external mechanical stresses.

In this regard, the composite structure 10 may further comprise an inner wall 16 and a core 14 located between the external wall 12 and the inner wall 16. In other words, by selecting volume V1 as the observation window, the composite structure 10 comprises successively the inner wall 16, the core 14, the external wall 12 and the electrically conductive strip 22 from the inside of the radome to the outside of the radome. However, by selecting a viewing window outside of volume V1, the composite structure 10 comprises successively the inner wall 16, the core 14 and the external wall 12 from inside the radome to outside the radome. In this viewing window, the core 14 is in contact with both an inner surface 13 of the external wall and an inner surface 15 of the inner wall.

The core 14 is, for example, in the form of a honeycomb, also called "nida" in the following, or of foam. Advantageously, the core 14 is made of a single material along the radome 1. In other words, in this embodiment, the core 14 is in the form of a nida along the radome 1. Thus, in addition to its structural homogeneity due to the absence of a part in the volume V1, the structural homogeneity of the composite structure 10 is also due to the fact that it is made of the same material in the volume V1 but also outside this volume. This avoids the need to densify the drilled areas, thus saving manufacturing time and obtaining a radome with limited ground. This also simplifies the manufacturing method of said composite structure 10.

Figure 4:
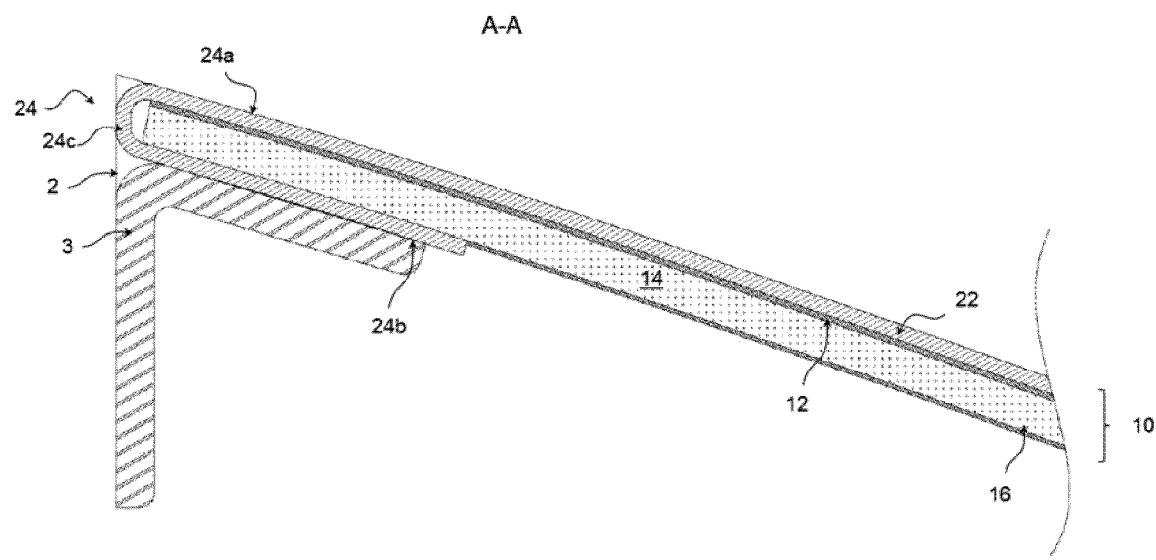
FIG. 4 shows a cross-sectional view along the sectional plane A-A shown in FIG. 1, at the base of the radome.

With reference to FIG. 4, the first end 24 of the electrically conductive strip advantageously bypasses the composite structure 10 at the level of the base 2. In other words, the first end 24 of the electrically conductive strip is configured to bypass the external wall 12, the core 14 and the inner wall 16 to contact the conductive base 3. Bypassing the composite structure 10 at the base 2 avoids the need to drill the radome 1 to connect the electrically conductive strip 22 to aircraft ground. This avoids the previously mentioned disadvantages of through-perforations in the radome at the electrically conductive strip 22.

Preferably, the first end 24 of the electrically conductive strip is U-shaped. That said, generally any shape that allows bypassing of the composite structure 10 could be suitable, the U shape being by no means limiting. The first end 24 of the electrically conductive strip comprises a first longitudinal leg 24a extending into the housing 20. The first longitudinal leg 24a faces towards the outside of the radome 1 and is located in the vicinity of the base 2. The first end 24 of the electrically conductive strip comprises a second longitudinal leg 24b in contact with the conductive base 3. More specifically, the second leg 24b is at least partially in contact with the conductive base 3. In other words, the second longitudinal leg 24b need not be entirely in contact with the conductive base 3. The first end 24 of the electrically conductive strip further comprises a transverse leg 24c connecting the first and second longitudinal legs 24a, 24b bypassing the base 2. In the example embodiment shown in FIG. 4, the transverse leg 24c takes the form of an arc extending laterally towards the outside from the composite structure 10, but it could take any other form as long as it connects the first and second longitudinal legs 24a, 24b and bypasses the composite structure 10 at the base 2. That being said, preferably, the transverse leg 24 bypasses the composite structure 10 in a close manner, which also allows it to improve the retention of the electrically conductive strip 22.

In this regard, it should be noted that the bypassing is possible at the base 2 because the radome 1 is a part of the aircraft which is not only independent of other parts of said aircraft but also can be manufactured independently of other parts. Thus, bypassing the composite structure 10 with the electrically conductive strip 22 can be achieved at the time of manufacture of the radome 1 without undue technical difficulty by the manufacturer. Furthermore, the electrically conductive strip 22 has a thickness—between a few tenths of a millimetre and a few millimetres—which is sufficiently small not to prevent the assembly of the parts and not to generate any sealing defect in the external structure of the aircraft. At the same time, the adhesive used during the structural bonding process is used to seal the space left free and in the case of a cofiring, a paste seal will be used. The bypassing of the composite structure 10 by the electrically conductive strip 22 is therefore not only advantageous because it avoids through perforations which in the long run can cause problems of mechanical strength of the composite structure 10, or even sealing problems, but also because it is technically easy to implement in a manufacturing method of the radome.

The base 3 is connected to the composite structure 10 by means of screws and non-through inserts. These pass through the second longitudinal leg 24b, the inner wall 16 and the core 14 without passing through the first longitudinal leg 24a and the external wall 12. Only the second longitudinal leg 24b, the inner wall 16 and the core 16 are therefore drilled, the first longitudinal leg 24a and the external wall 12 remaining intact. The composite structure 10 therefore does not comprise any perforation in the external wall 12, in particular in the area of the electrically conductive strip, but only at the aforementioned location. The composite structure 10 and the conductive base 3 are thus rigidly connected.

Figure 5:
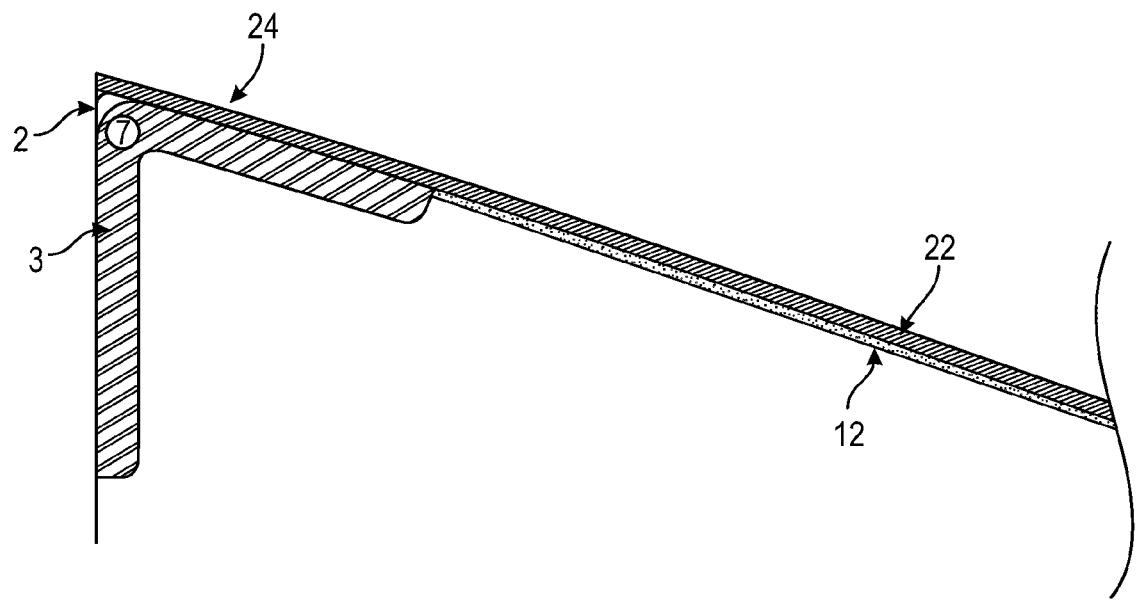
FIG. 5 illustrates a cross-sectional view of the radome according to sectional plane A-A shown in FIG. 1 in an alternative embodiment, at the base.

According to a variant illustrated in FIG. 5, the composite structure 10 is advantageously a monolithic structure. By "monolithic structure" is meant that the composite structure 10 is devoid of a core 14. In other words, the composite structure 10 comprises only the external wall 12, the housing 20 and the electrically conductive strip 22, the inner surface 13 of the external wall being directly opposite the interior of the radome. The monolithic structure has several advantages. In addition to saving material, the monolithic structure is also simpler to implement.

This is because when the composite structure 10 is in the form of a monolithic structure, the electrically conductive strip 22 can be straight between the first end 24 and the second end 26, as the monolithic structure has a much smaller thickness than the composite structure 10 with a nida-shaped core 14, so that it can be aligned with the conductive base 3. Therefore, it is entirely possible to use a straight electrically conductive strip 22 between the first end 24 and the second end 26. The manufacturing method of the radome 1 is further simplified. In this case, the composite structure 10 is connected to the radome 1 by screwing the composite structure 10 to the conductive base 3. However, it should be noted that this attachment is not made at the electrically conductive strip 22, but in a portion of the conductive base 3 that does not face the strip 22.

FIGS. 6 to 11 illustrate a second embodiment of the invention in which the electrically conductive strip 22 is in contact with the inner surface 13, said housing 20 being within the composite structure 10. By the housing 20 is meant "inside the composite structure 10" the fact that the housing 20, although belonging to the composite structure 10, is positioned on the side of the inner surface 13 of the external wall 12.

Figure 6:
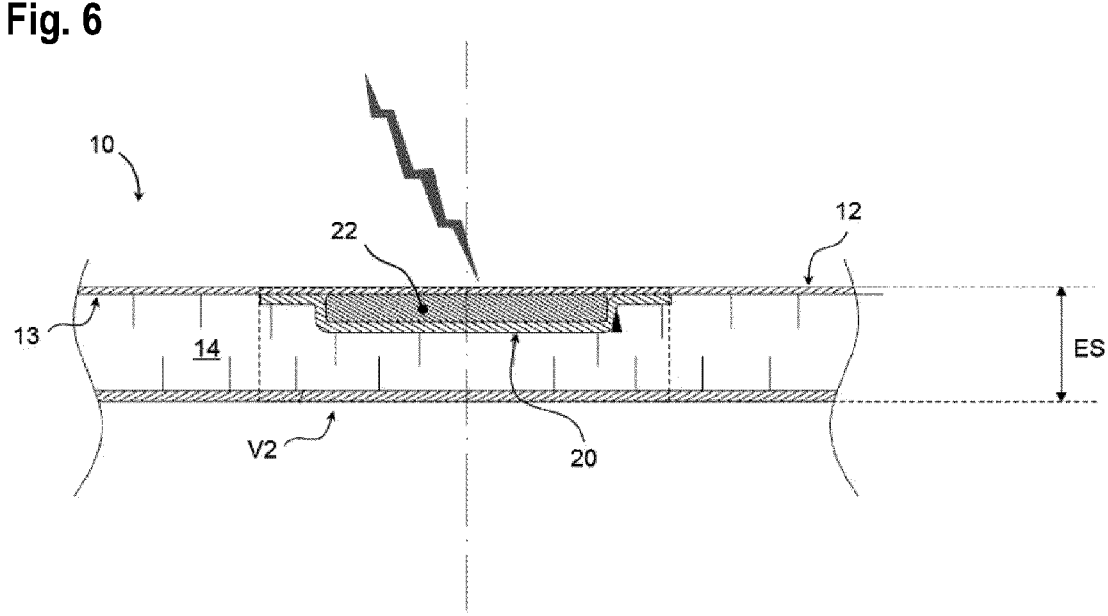
FIG. 6 illustrates a cross-sectional view of a radome according to a second embodiment of the invention.

With reference to FIG. 6, in the second embodiment of the invention the housing 20 is closed by the external wall 12, said external wall 12 completely covering the housing 20 and the electrically conductive strip 22. In effect, the housing 20 is in the form of an open pocket or reservoir which would be open to the exterior at one face if it were not closed by the external wall 12 at said face. Incidentally, as the housing 20 accommodates the electrically conductive strip 22, the latter is therefore encapsulated between the housing 20 and the external wall 12. The arrangement of the electrically conductive strip 22 and the housing 20 with respect to the external wall 12 thus avoids creating asperities on the external wall 12.

Advantageously, the external wall 12 has a thickness of between 0.15 mm and 1.00 mm. The external wall 12 thus has a thickness suitable for conducting the lightning energy to the electrically conductive strip 22, and possibly being perforated in the event of a lightning strike on said external wall 12, while limiting the quantity of pulverised material. Indeed, the energy at which the material is ionised during a lightning strike may be sufficient to pulverise a large quantity of material from which the external wall 12 is made. This must be limited as it is risky. Thus, the thickness range of the external wall 12 represents a compromise between the need to conduct the lightning energy to the electrically conductive strip 22 and limiting the amount of pulverised material. In this regard, the fact that the electrically conductive strip 22 is in contact with the inner surface 13 of the external wall keeps the thickness to a minimum.

Figure 7:
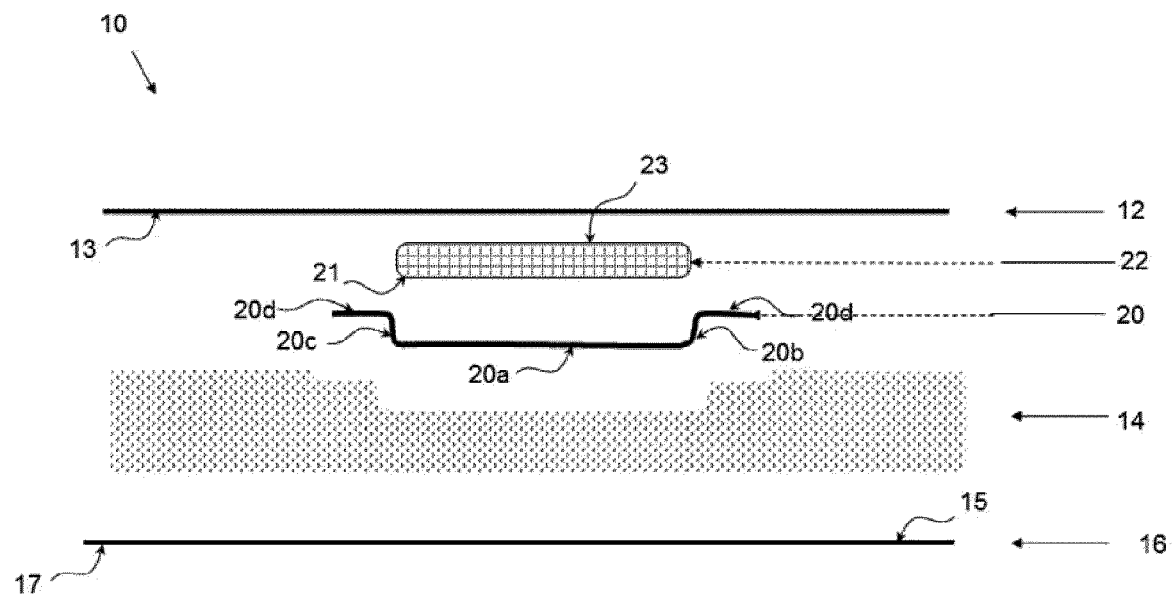
FIG. 7 shows an exploded view of the cross-sectional view of FIG. 6.

With reference to FIG. 7, the housing 20 has an Ω ("omega") shape comprising a U-shaped longitudinal portion from which two hooking tabs 20d extend.

The U-shaped longitudinal portion extends between the front of the radome, at a second end 26 of the electrically conductive strip, and the base 2. In this embodiment, the second end 26 extends into the housing 20 and without being retained by an attachment means. Indeed, as the electrically conductive strip 22 is covered by the external wall 12, no means for attaching the second end 26 is required as it is not susceptible to being unstuck by the air flux.

The U-shaped longitudinal portion comprises a transverse leg 20a and two longitudinal legs 20b, 20c extending from the transverse leg 20a. Since the electrically conductive strip 22 is disposed in the U-shaped longitudinal portion, the dimensions of the U-shaped longitudinal portion are adapted to the dimensions of the electrically conductive strip 22. Incidentally, as the electrically conductive strip 22 is in contact with the inner surface 13 of the external wall, the length of the longitudinal legs 20b, 20c is substantially equal to the thickness of the electrically conductive strip 22.

As for the two hooking tabs 20d, they extend from the U-shaped longitudinal portion, giving the housing a general Ω shape. More specifically, each hooking tab 20d extends from the other end of the longitudinal legs 20b, 20c respectively which is not connected to the transverse leg 20a.

To form the "pocket" an additive to the moulding tool is added during this phase of the radome manufacturing method. This additive is then removed to allow insertion of the final metal strip. Preferably, said electrically conductive strip 22 is retained in the housing 20 which constitutes the pocket by a gluing or riveting or screwing method. It should be noted that in this area, it does not matter if the composite structure 10 is perforated since this area is never in direct contact with lightning strikes.

In the embodiment shown in FIG. 7, the composite structure 10 may further comprise an inner wall 16 and a core 14 located between the housing 20—and the portions of the inner surface 13 below the housing 20—and the inner wall 16. Let a volume V2 of the composite structure 10 having as a base, in the geometrical sense of the term, an orthogonal projection of the housing 20 on the inner surface 13 and as a height, in the geometrical sense of the term, a thickness ES of the composite structure. Selecting as the observation window the volume V2, the composite structure 10 comprises successively, in this example of embodiment, the inner wall 16, the core 14, the housing 20, the electrically conductive strip 22 and the external wall 12, from the inside of the radome to the outside of the radome. Obviously, in the area of volume V2 where the hooking tabs 20d are located, the composite structure 10 comprises successively the inner wall 16, the core 14, the hooking tabs 20d of the housing and the external wall 12. However, by selecting an observation window outside the volume V2, the composite structure 10 comprises successively the inner wall 16, the core 14 and the external wall 12. In the latter observation window, the core 14 is therefore in contact with both the inner surface 13 of the external wall and an inner surface 15 of the inner wall.

Figure 8:
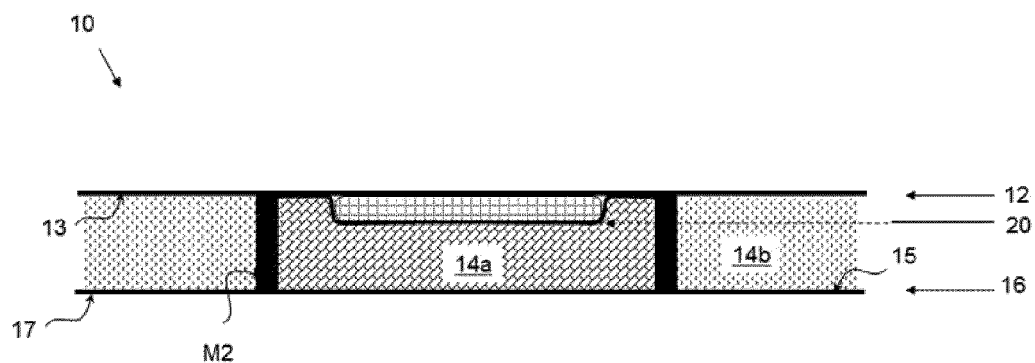
FIG. 8 illustrates a cross-sectional view of the radome according to an alternative embodiment of the second embodiment.

In the example embodiment shown in FIG. 8, the structure of the core 14 in a volume V3 having as its base the housing 20 and having as its height the distance between the housing 20 and the inner wall 16 differs from the structure of the core 14 in the rest of the composite structure. It should be noted that the volume V3 differs from the volume V2 in that it does not include the volume between the housing 20 and the external wall 12. In this embodiment, the volume V3 comprises a material 14a consisting of a foam or densified zone, while the remainder 14b of the core 14 is in the form of a honeycomb or nida 14b. In practice, the volume V2 constitutes a "reserve" which allows to differentiate the material 14a from the rest of the core 14b as required, depending on the mechanical requirements. This reserve is produced by machining or thermoforming. In order to join the foam 14a to the nida 14b, the composite structure 10 may further comprise adhesion strips 25 located at the interfaces between the material 14a, i.e., the foam 14a. One interface being in close proximity to one of the hooking tabs 20d, the other in close proximity to the other of the hooking tabs 20d. Preferably, the adhesion strips 25 consist of intumescent areas. These are made by exposing the foam 14a to heat which allows it to swell and better adhere to the nida.

Figure 10:
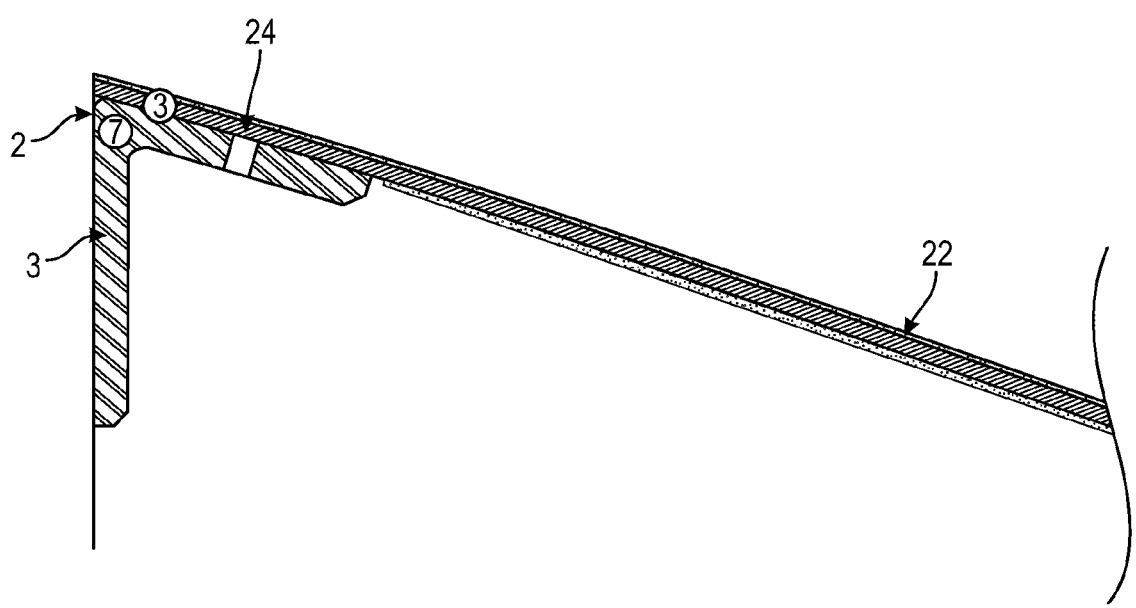
FIG. 10 illustrates a cross-sectional view of the radome according to an alternative embodiment of the second embodiment.
Figure 11:
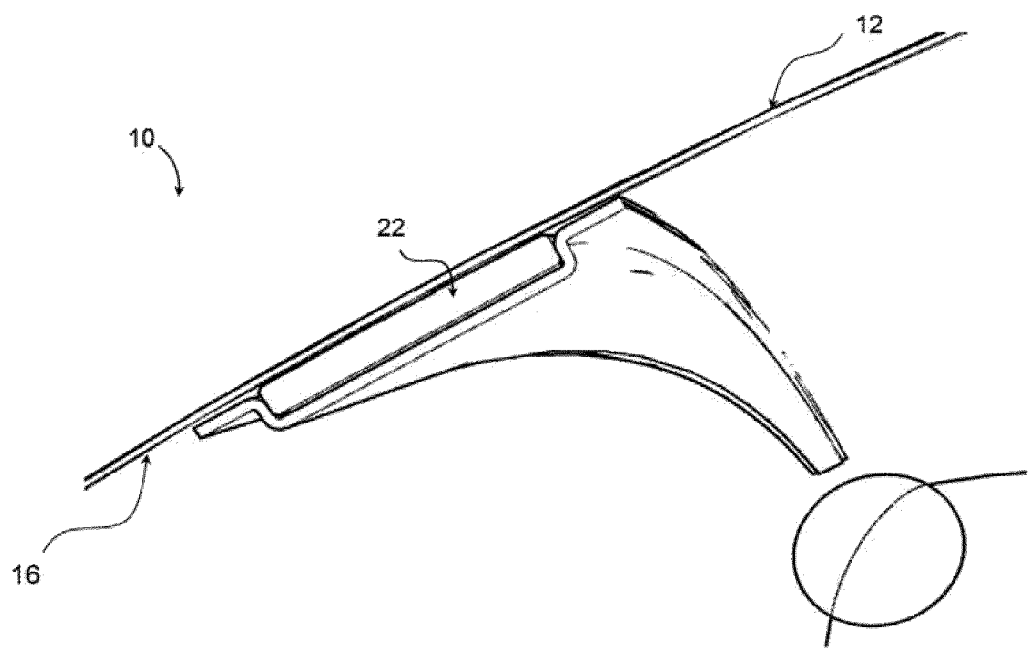
FIG. 11 illustrates a cross-sectional view of the radome of FIG. 10, at the base.

Whilst in the example embodiments of FIGS. 7 and 8, the composite structure 10 comprises a core 14 in the form of a nida, this is not always the case, as will be seen in the description relating to FIGS. 10 and 11.

Figure 9:
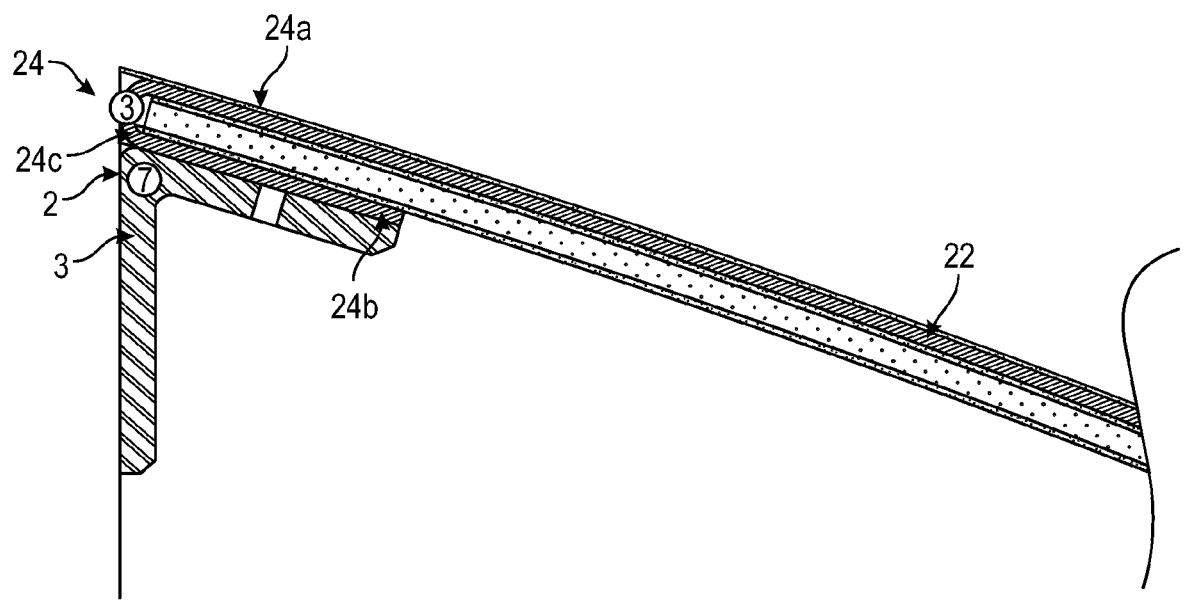
FIG. 9 shows a cross-sectional view of the radome shown in FIGS. 6 to 8, at the base of the radome.

With reference to FIG. 9, the first end 24 of the electrically conductive strip advantageously bypasses the composite structure 10 at the base 2. This bypass is similar to that seen with reference to FIG. 4 but differs only in the nature of the layers bypassed. Indeed, as seen previously, the electrically conductive strip 22 is not arranged in the same way with respect to the external wall 12. Thus, in this embodiment, the first end 24 of the electrically conductive strip bypasses the housing 20, the core 14 and the inner wall 16 to come into contact with the conductive base 3. As a reminder, bypassing the composite structure 10 at the base 2 avoids the need to drill the radome 1 to connect the electrically conductive strip 22 to the aircraft ground. This avoids the disadvantages of through-perforations in the radome at the electrically conductive strip 22. As before, the base 3 is connected to the composite structure 10 by means of screws and non-through inserts. These pass through the second longitudinal leg 24b, the inner wall 16 and the core 14 without passing through the first longitudinal leg 24a and the external wall 12. Only the second longitudinal leg 24b, the inner wall 16 and the core 16 are therefore drilled, the first longitudinal leg 24a and the external wall 12 remaining intact.

As in the first embodiment, the first end 24 of the electrically conductive strip is therefore U-shaped. The description of the U-shape and its arrangement in the composite structure therefore applies to the present embodiment except for the nature of the contoured layers.

According to the variant illustrated in FIGS. 10 and 11, the composite structure 10 is advantageously a monolithic structure meeting the same definition as that previously seen in relation to the first embodiment. In other words, the composite structure 10 comprises only the external wall 12, the housing 20 and the electrically conductive strip 22, with the inner surface 13 of the external wall 12 and the side of the housing 20 opposite that facing the external wall 12 directly facing the interior of the radome. The advantages of such a monolithic structure are the same as those previously seen in relation to the first embodiment. In particular, in this embodiment the electrically conductive strip 22 is notably straight between the first end 24 and the second end 26.

The invention also relates to an aircraft comprising an antenna capable of transmitting and receiving a radio frequency signal and a radome 1 as previously described. The radome 1 allows the antenna to be protected from lightning strikes while maintaining good mechanical strength, even after repeated lightning strikes.

The aircraft may be a fixed wing aircraft (e.g., aeroplane) or a rotary wing aircraft (e.g. helicopter).

The invention claimed is:

1. An aircraft radome comprising:
a composite structure defining at least one housing located inside or outside the composite structure and extending along the radome from a base of said radome, said at least one housing receiving an electrically conductive strip and said conductive strip being either in contact with an inner surface of an external wall of the composite structure when said at least one housing is inside the composite structure, or flush with the external wall of the composite structure when said at least one housing is outside the composite structure,
a conductive base located at a level of said radome base and connected to a ground of the aircraft,
said composite structure being devoid of any perforations or passages through the external wall at the electrically conductive strip, and a first end of said electrically conductive strip being in contact with the conductive base.

2. The radome of claim 1, wherein when the housing is outside the composite structure, an inner surface of the electrically conductive strip conforms to contours of the housing.

3. The radome according to claim 1, wherein the composite structure further comprises an inner wall and a core, located between the external wall and the inner wall, the core being made of a single material along the radome.

4. The radome according to claim 1, when the housing is outside the composite structure, said radome further comprising at least one further housing formed in the external wall, said at least one further housing being located in an extension of the housing and receiving a second end of the electrically conductive strip and means for attaching said second end of the electrically conductive strip to the external wall, the means for attaching being flush with portions of the external wall other than a portion where the second housing is formed.

5. The radome according to claim 4, wherein the means for attaching comprise a patch attaching the second end of the electrically conductive strip in said at least one further housing.

6. The radome according to claim 1, wherein when the housing is inside the composite structure, the housing comprises a U-shaped longitudinal portion comprising two longitudinal legs and a transverse leg, said housing comprising two hooking tabs at the inner surface of the external wall, said hooking tabs extending from the longitudinal legs.

7. The radome according to claim 6, wherein the composite structure further comprises an inner wall and a core located between the external wall and the inner wall, the housing-extending through the thickness of the core.

8. The radome according to claim 7, wherein the core comprises, in a volume having as a base the housing and having as a height a distance between the housing and the inner wall, a different material from a material of the rest of the core.

9. The radome according to claim 8, comprising adhesion strips located at interfaces between the material and the rest of the core.

10. The radome according to claim 6, wherein the external wall has a thickness of between 0.15 mm and 1.00 mm.

11. The radome according to claim 1, wherein the first end of the electrically conductive strip bypasses the composite structure at the base.

12. The radome according to claim 11, wherein said first end of the electrically conductive strip is U-shaped, said first end of the electrically conductive strip comprising a first longitudinal leg extending into the housing, a second longitudinal leg contacting the base, and a transverse leg connecting the first and second longitudinal legs bypassing the composite structure at the base.

13. The radome according to claim 1, wherein when the housing is outside the composite structure, wherein the composite structure comprises only the external wall, the housing and the electrically conductive strip, with the inner surface of the external wall directly facing an interior of the radome.

14. The radome according to claim 1, wherein when the housing is inside the composite structure, the composite structure comprises only the external wall, the housing and the electrically conductive strip, with the inner surface of the external wall and the side of the housing opposite the side facing the external wall directly facing an interior of the radome.

15. The radome according to claim 13, wherein the electrically conductive strip is straight between the first end and the second end.

16. An aircraft comprising:
an antenna for transmitting and receiving a radio frequency signal,
a radome according to claim 1.

17. The radome according to claim 1, wherein the composite structure further comprises an inner wall and a core in the form of a honeycomb, located between the external wall and the inner wall, the core being made of a single material along the radome.

18. The radome according to claim 6, wherein the composite structure further comprises an inner wall and a core in the form of a honeycomb located between the external wall and the inner wall, the housing extending through the thickness of the core.

* * * * *